(12) United States Patent
Lim et al.

(10) Patent No.: US 9,360,896 B2
(45) Date of Patent: Jun. 7, 2016

(54) LOW-PROFILE HINGE FOR AN ELECTRONIC DEVICE

(71) Applicant: Intel Corporation, Santa Clara, CA (US)

(72) Inventors: Min Suet Lim, Bayan Lepas (MY); Bok Eng Cheah, Bayan Lepas (MY); Howe Yin Loo, Sungai Petani (MY); Jackson Chung Peng Kong, Tanjung Tokong (MY); Poh Tat Oh, Bayan Lepas (MY)

(73) Assignee: Intel Corporation, Santa Clara, CA (US)

(*) Notice: Subject to any disclaimer, the term of this patent is extended or adjusted under 35 U.S.C. 154(b) by 122 days.

(21) Appl. No.: 14/229,830

(22) Filed: Mar. 28, 2014

(65) Prior Publication Data

US 2015/0277505 A1 Oct. 1, 2015

(51) Int. Cl.
*E05D 3/06* (2006.01)
*G06F 1/16* (2006.01)

(52) U.S. Cl.
CPC ............ *G06F 1/1681* (2013.01); *G06F 1/1616* (2013.01); *G06F 1/1637* (2013.01); *Y10T 16/547* (2015.01)

(58) Field of Classification Search
CPC ........................................................ E05D 3/06
USPC ............................ 16/287, 294, 366, 386, 390
See application file for complete search history.

(56) References Cited

U.S. PATENT DOCUMENTS

| | | | | | |
|---|---|---|---|---|---|
| 1,984,092 | A | * | 12/1934 | Soss ........................ | E05D 3/16 16/369 |
| 2,013,915 | A | * | 9/1935 | Hughes ..................... | E05D 3/16 16/369 |
| 2,200,142 | A | * | 5/1940 | Witschi ..................... | E05D 3/16 16/369 |
| 2,721,353 | A | * | 10/1955 | MacKintosh ............. | E05D 3/16 16/294 |
| 4,858,488 | A | * | 8/1989 | Butts ........................ | E05D 3/06 16/368 |

(Continued)

FOREIGN PATENT DOCUMENTS

| | | |
|---|---|---|
| CN | 101451573 A | 6/2009 |
| JP | 2002-229674 A | 8/2002 |

(Continued)

OTHER PUBLICATIONS

International Search Report and Written Opinion in International Application No. PCT/US2015/018207, mailed on May 19, 2015, 12 pages.

(Continued)

*Primary Examiner* — Roberta Delisle
(74) *Attorney, Agent, or Firm* — Patent Capital Group

(57) ABSTRACT

Particular embodiments described herein provide for an electronic device, such as a notebook computer or laptop, that includes a circuit board coupled to a plurality of electronic components (which includes any type of components, elements, circuitry, etc.). One particular example implementation of the electronic device may include a low-profile hinge design that includes a first segment that connects to a first element using a first coupler and to a second segment that connects to the first segment using a second coupler, where the second segment connects to a second element using a third coupler. The first coupler, the second coupler, and the third coupler may each have a first coupling arm and a second coupling arm and the first coupling arm can be offset from a plane of the second coupling arm by about five degrees to about forty-five degrees.

25 Claims, 16 Drawing Sheets

(56) References Cited

U.S. PATENT DOCUMENTS

| | | |
|---|---|---|
| 6,527,036 B1 | 3/2003 | Welsh |
| 7,377,012 B2 * | 5/2008 | Lu .................. G06F 1/1616 16/342 |
| 7,500,288 B2 * | 3/2009 | Chung .............. E05D 11/082 16/342 |
| 7,532,916 B2 | 5/2009 | Lee et al. |
| 7,805,810 B2 * | 10/2010 | Hoffman ............ E05D 3/127 16/354 |
| 8,060,985 B2 * | 11/2011 | Lin .................. E05D 11/082 16/342 |
| 8,125,759 B2 * | 2/2012 | Fukuma .............. F16G 13/18 248/349.1 |
| 8,320,123 B2 * | 11/2012 | Chen ................ G06F 1/1681 248/254 |
| 8,424,160 B2 * | 4/2013 | Chen ................ E05D 11/084 16/278 |
| 8,713,759 B2 * | 5/2014 | Cai .................. G06F 1/1681 16/366 |
| 8,720,011 B1 | 5/2014 | Hsu et al. |
| 8,813,312 B2 | 8/2014 | Song et al. |
| 9,047,055 B2 | 6/2015 | Song |
| 2004/0139579 A1 * | 7/2004 | Su .................... G06F 1/1681 16/351 |
| 2004/0212968 A1 | 10/2004 | Lin |
| 2009/0310298 A1 * | 12/2009 | Chou ................ G06F 1/1616 361/679.55 |
| 2010/0018020 A1 | 1/2010 | Huang |
| 2010/0024171 A1 * | 2/2010 | Wang ................ G06F 1/1616 16/386 |
| 2010/0226089 A1 | 9/2010 | Wang et al. |
| 2011/0261515 A1 | 10/2011 | Li et al. |
| 2011/0265288 A1 * | 11/2011 | Chiang .............. G06F 1/1681 16/341 |
| 2012/0147542 A1 | 6/2012 | Kim |
| 2012/0236485 A1 | 9/2012 | Staats et al. |
| 2013/0010405 A1 | 1/2013 | Rothkopf et al. |
| 2013/0301206 A1 | 11/2013 | Whitt, III et al. |
| 2015/0277506 A1 | 10/2015 | Cheah et al. |

FOREIGN PATENT DOCUMENTS

| | | |
|---|---|---|
| WO | WO 2015/148057 A1 | 10/2015 |
| WO | WO 2015/153032 A1 | 10/2015 |

OTHER PUBLICATIONS

International Search Report and Written Opinion in International Application No. PCT/US2015/018204, mailed on Jun. 10, 2015, 14 pages.

USPTO Nonfinal Rejection in U.S. Appl. No. 14/229,835, mailed on Nov. 10, 2015, 1 pages.

* cited by examiner

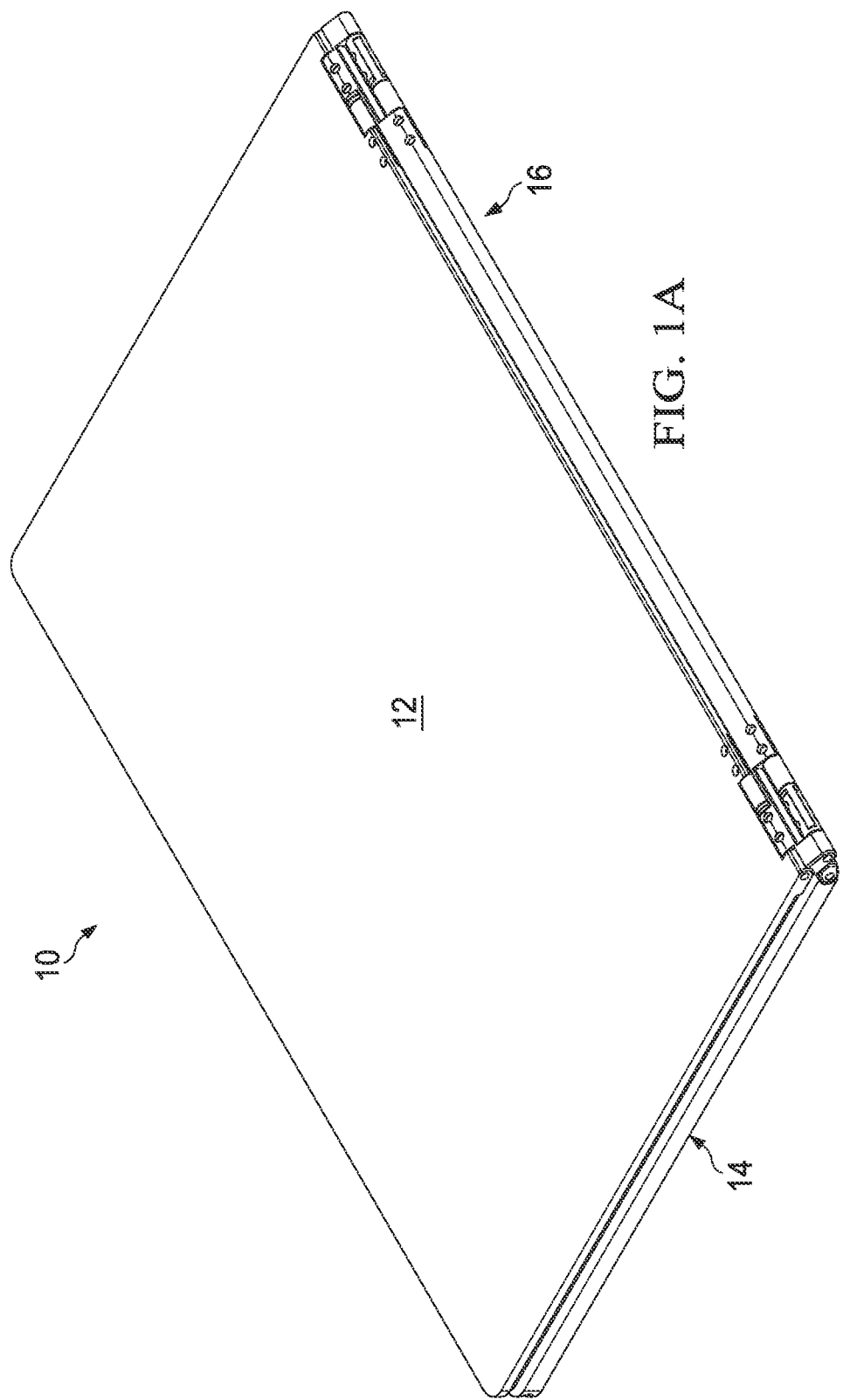

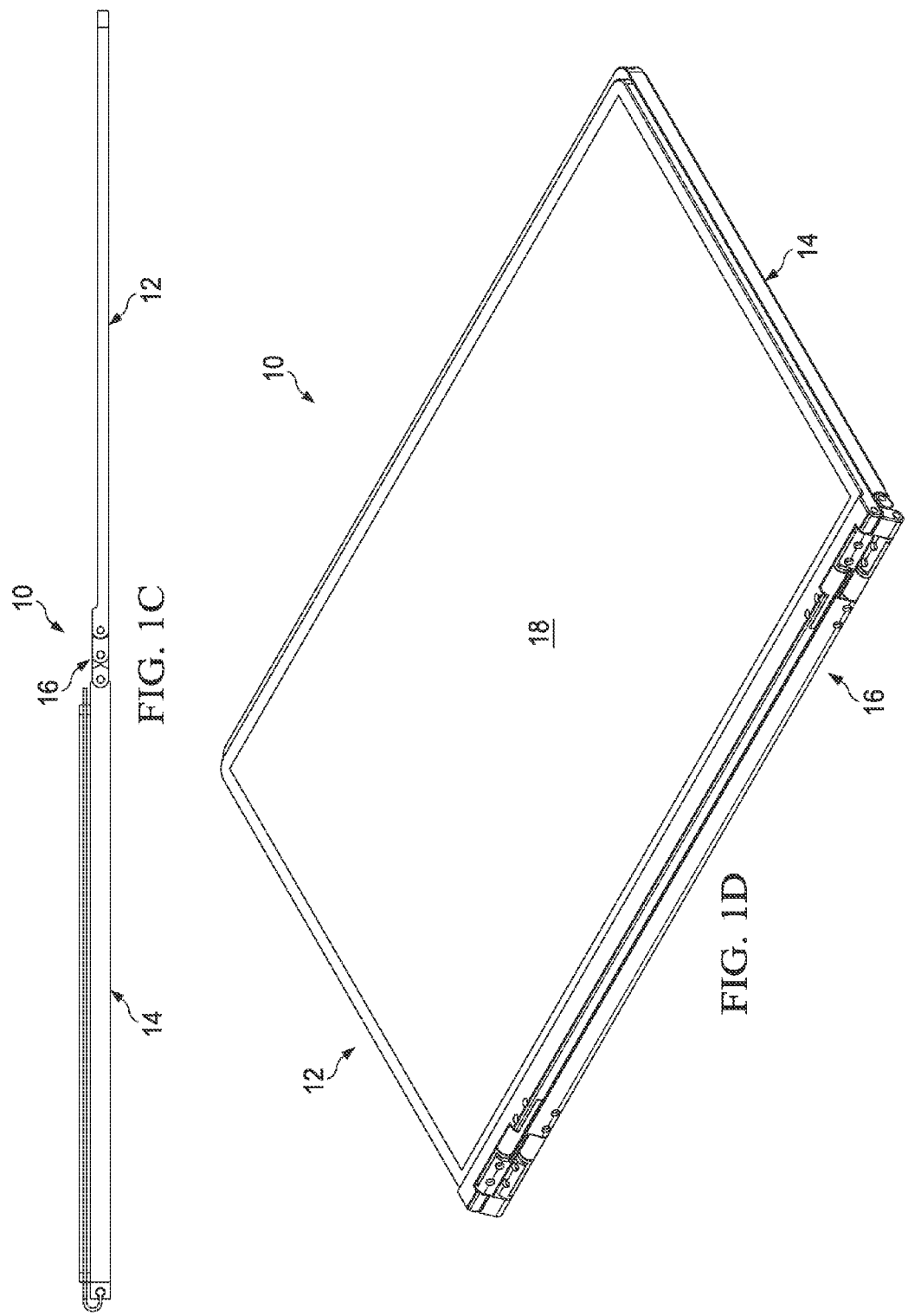

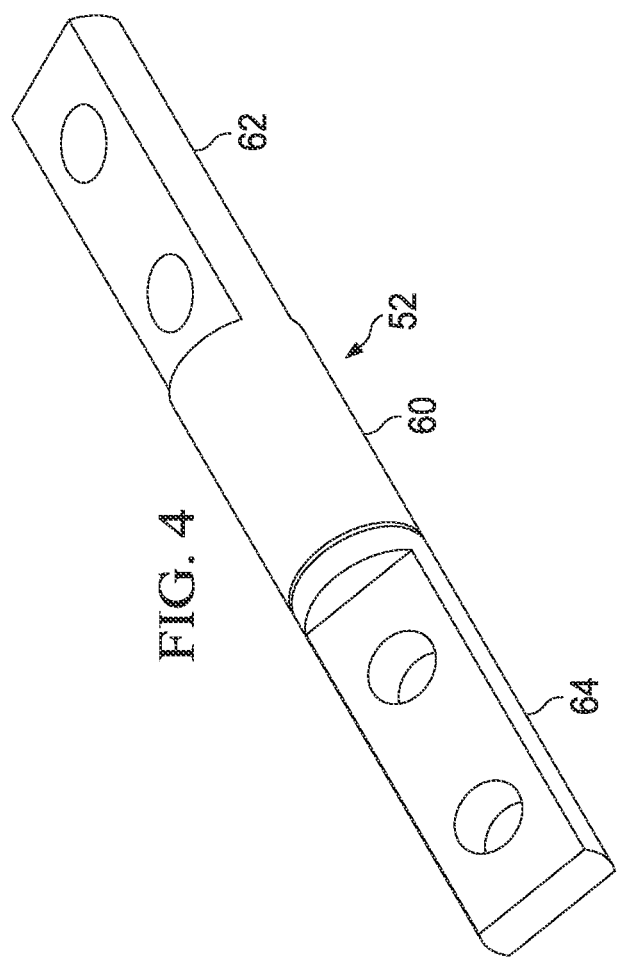

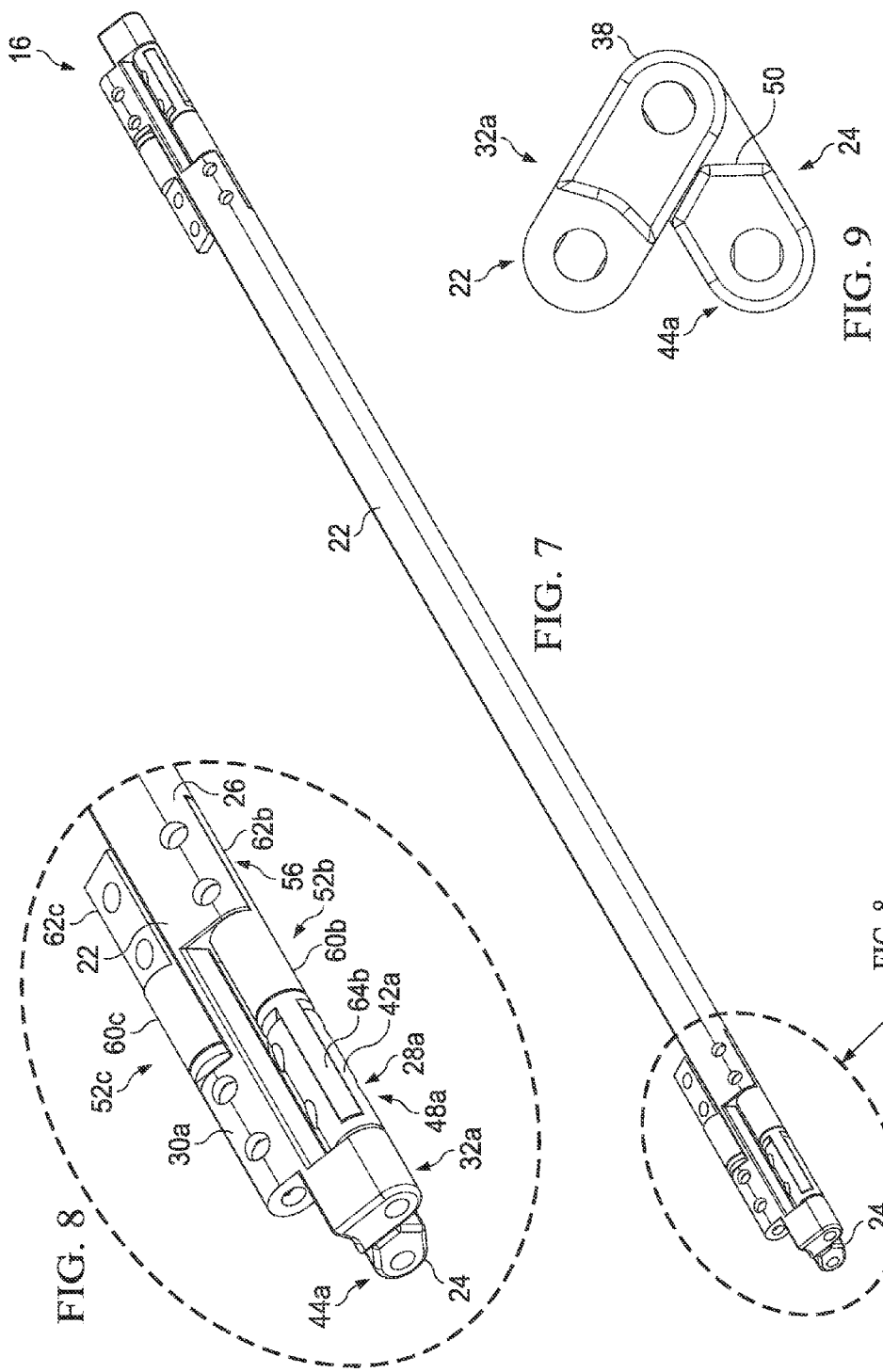

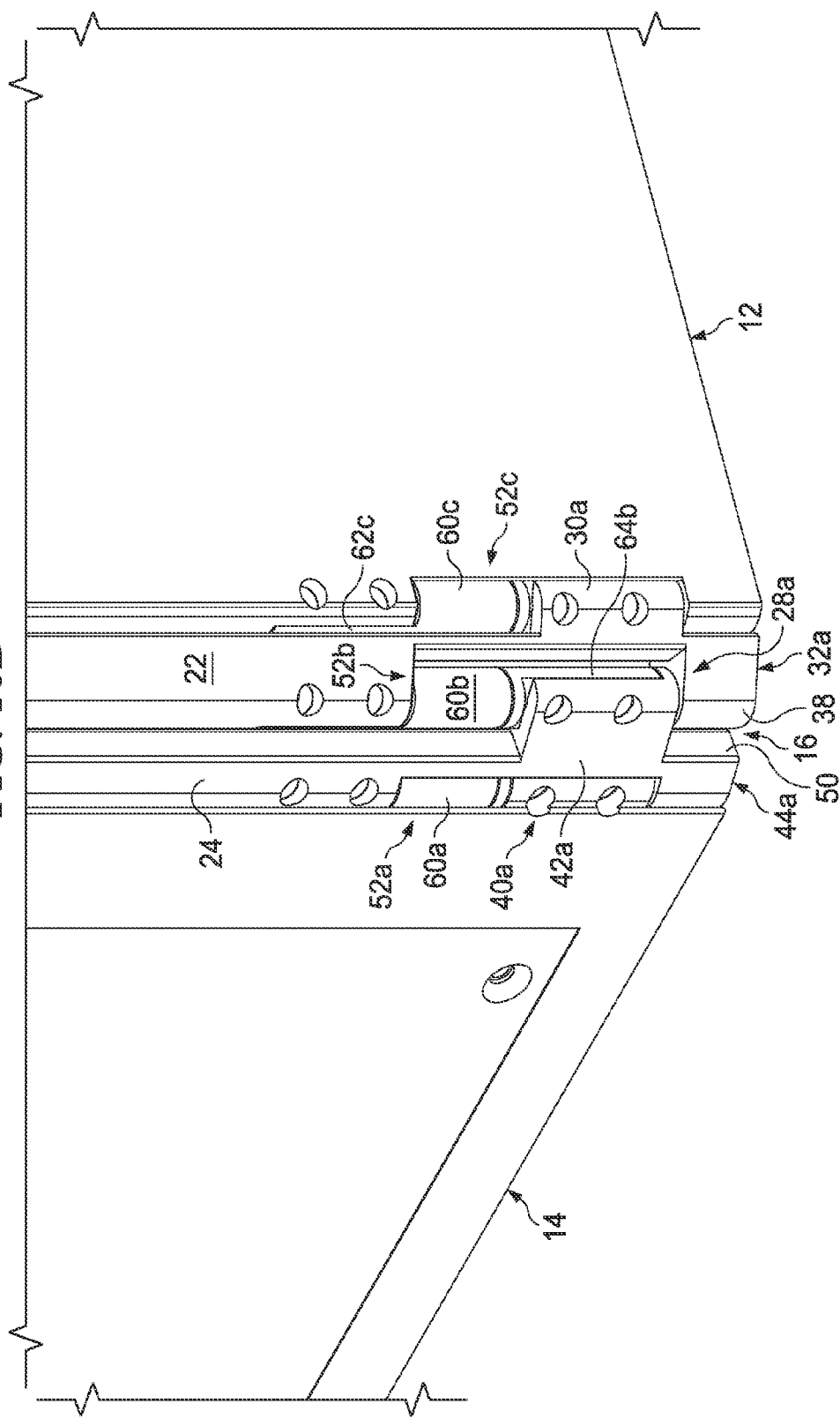

LOW-PROFILE HINGE FOR AN ELECTRONIC DEVICE

FIELD OF THE DISCLOSURE

Embodiments described herein generally relate to the field of hinges, and more particularly, to low-profile hinges for an electronic device.

BACKGROUND

End users have more electronic device choices than ever before. A number of prominent technological trends are currently afoot (e.g., more computing devices, more devices that can change into different configurations, etc.), and these trends are changing the electronic device landscape. One of the technological trends is a hybrid laptop (e.g., a convertible computer, fold over notebook, etc.). A hybrid laptop, is a one-piece mobile computer that can include a laptop configuration and a tablet configuration. To convert from the laptop configuration to the tablet configuration, often the display or screen can rotate, twist, or spin over a keyboard. While hybrid laptops are a compelling way of delivering convertibility from a laptop configuration to a tablet configuration, in some designs, the hinge can be bulky and limit the form-factor of the device.

BRIEF DESCRIPTION OF THE DRAWINGS

Embodiments are illustrated by way of example and not by way of limitation in the FIGURES of the accompanying drawings, in which like references indicate similar elements and in which:

FIG. 1A is a simplified orthographic view illustrating an embodiment of an electronic device in a closed landscape clamshell configuration, in accordance with one embodiment of the present disclosure;

FIG. 1C is a simplified orthographic view illustrating an embodiment of an electronic device in a flat configuration, in accordance with one embodiment of the present disclosure;

FIG. 1D is a simplified orthographic view illustrating an embodiment of an electronic device in a tablet configuration, in accordance with one embodiment of the present disclosure;

FIG. 4 is a simplified orthographic view illustrating an embodiment of a portion of a hinge, in accordance with one embodiment of the present disclosure;

FIG. 7 is a simplified orthographic view illustrating an embodiment of a hinge, in accordance with one embodiment of the present disclosure;

FIG. 8 is a simplified orthographic view illustrating an embodiment of a portion of a hinge, in accordance with one embodiment of the present disclosure;

FIG. 9 is a simplified side view illustrating an embodiment of a portion of a hinge, in accordance with one embodiment of the present disclosure;

FIG. 10D is a simplified orthographic view illustrating an embodiment of a portion of an electronic device, in accordance with one embodiment of the present disclosure;

Figure 1B:
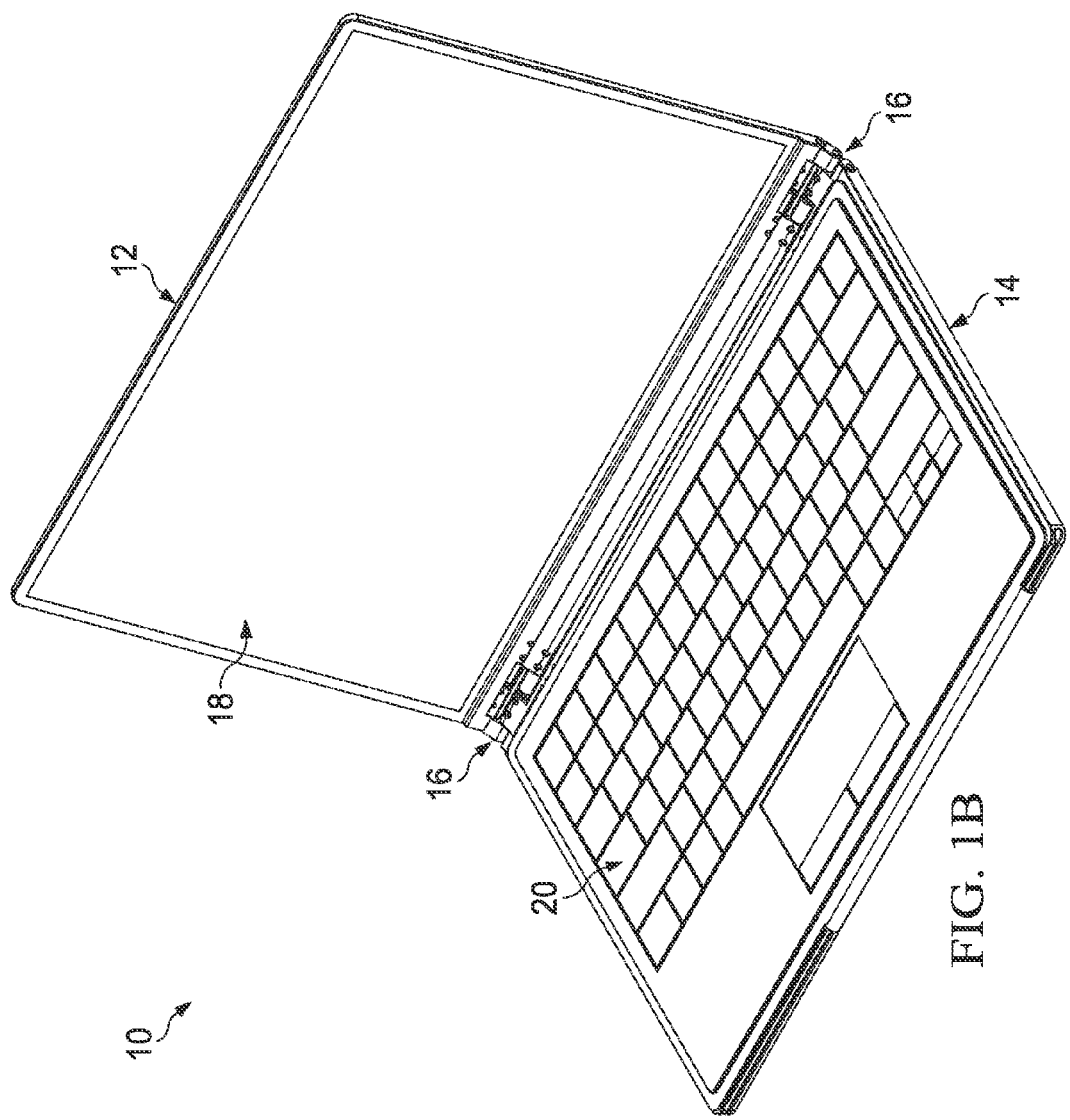
FIG. 1B is a simplified orthographic view illustrating an embodiment of an electronic device in an open clamshell configuration, in accordance with one embodiment of the present disclosure.

The FIGURES of the drawings are not necessarily drawn to scale, as their dimensions can be varied considerably without departing from the scope of the present disclosure.

DETAILED DESCRIPTION OF THE EMBODIMENTS

Overview

In an example, there is disclosed a system, an apparatus, and a method for a low-profile hinge design. In one example embodiment, a low-profile hinge can include a first segment that connects to a first element using a first coupler and to a second segment that connects to the first segment using a second coupler. The second segment can connect to a second element using a third coupler. The first coupler, the second coupler and the third coupler may each have a first coupling arm and a second coupling arm and the first coupling arm can be offset from a plane of the second coupling arm by about five degrees to about forty-five degrees. In addition, the hinge can be configured to lay flat on a planer surface as well as rotate about three hundred and sixty degrees. To help facilitate the rotation, a side of the first segment can include a peak profile and a side bottom edge of the second segment can rotate around the peak profile. In another example embodiment, an electronic device is provided and includes a keyboard portion coupled to a first segment using a first coupler, a second segment that is coupled to the first segment using a second coupler, and a display portion coupled to the second segment using a third coupler.

Example Embodiments of the Disclosure

A hybrid laptop, is a one-piece mobile computer that can include a laptop configuration and a tablet configuration. To convert from the laptop configuration to the tablet configuration, often the display or screen can rotate, twist, or spin over a keyboard. While hybrid laptops are a compelling way of delivering convertibility from a laptop configuration to a tablet configuration, in some designs, the hinge can be bulky and limit the form-factor of the device. For example, the z-height (height on the z axis of an X, Y, Z, Cartesian coordinate system) of the hybrid laptop is often dependent on the hinge design.

Currently, form-factor limitations for electronic devices such as hybrid laptops are addressed by enabling ultra-low-profile and small form-factor components (e.g., coreless package and motherboard, connectors, batteries, etc.). The development of high density super-capacitors is also being used to further reduce the battery form-factor and density to enable low-profile platforms. However, the form factor for a low-profile device is often limited by the hinge.

The foregoing is offered by way of non-limiting examples in which the system and method of the present specification may usefully be deployed. The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In the examples of the present specification, a system and method is provided for a low-profile hinge design. In one example, using a multiple-friction segment design, a device (e.g., an electrical device) can be configured with a hinge such that the hinge form-factor does not limit the scaling of the total z-height of the device. The hinge can be a low-profile, collapsible, three hundred and sixty degree (360°) hinge. The total thickness of the hinge design can be scaled according to a desired z-height through configuring the dimension of the segment components of the hinge. Hence, the overall z-height of the device can be scaled based on the components of the device (e.g., the display portion and keyboard portion) and not be limited by the hinge size. For example, using the low-profile hinge design an electronic device can operate in a low-profile clamshell configuration, a low-profile flat configuration, and a low-profile tablet configuration.

The following is an illustration of an example of a low-profile hinge design according to one or more example embodiments of the present specification. It should be noted that the hinge designs disclosed here are given as non-limiting examples only, and it is intended that any suitable technique or configuration should be included in the broad scope of this specification.

Example Embodiments

The following detailed description sets forth example embodiments of apparatuses, methods, and systems relating to low-profile hinge configurations for an electronic device. Features such as structure(s), function(s), and/or characteristic(s), for example, are described with reference to one embodiment as a matter of convenience; various embodiments may be implemented with any suitable one or more of the described features.

Turning to FIG. 1A, FIG. 1A is a simplified orthographic view illustrating an embodiment of an electronic device 10 in a closed clamshell configuration in accordance with one embodiment of the present disclosure. Electronic device 10 may include a display portion 12, a keyboard portion 14, and a hinge 16. Hinge 16 can define an axis of rotation that is shared between display portion 12 and keyboard portion 14. The hinge may be a low-profile hinge. The term low-profile hinge includes a hinge with a low, flat, or relatively flat profile with a low total z-height. As used throughout this Specification, the z-height is the height on the z axis of an X, Y, Z Cartesian coordinate system.

In one or more embodiments, electronic device 10 is a notebook computer or laptop computer. In still other embodiments, electronic device 10 may be any suitable electronic device having a display such as a mobile device, a tablet computer and/or a tablet device (e.g., iPad™), phablet, a personal digital assistant (PDA), a smartphone, an audio system, a movie player of any type, a computer docking station, etc. In yet another embodiment, most of the electronics (e.g., processor, memory, etc.) for electronic device 10 reside in keyboard portion 14.

In one or more embodiments, keyboard portion 14 can function as an input device and may include a mechanical keyboard, touch screen, input area, etc. The touch screen can detect the presence and location of a touch within the touch screen area. In one example, the touch screen can be configured to allow for the input of letters, numbers, characters, functions, etc. similar to a mechanical keyboard and the touch screen may be used in place of (or instead of) a mechanical keyboard. In another example, the touch screen may supplement a mechanical keyboard and may be configured to operate as a number key pad, design area, function call, or some other similar input area.

Turning to FIG. 1B, FIG. 1B is a simplified orthographic view of electronic device 10 in an open clamshell configuration in accordance with one embodiment of the present disclosure. Display portion 12 can include a display 18. Keyboard portion 14 can include a keyboard 20. In one or more embodiments, display 18 can be a liquid crystal display (LCD) display screen, a light-emitting diode (LED) display screen, an organic light-emitting diode (OLED) display screen, a plasma display screen, or any other suitable display screen system. Display 18 may be a touchscreen that can detect the presence and location of a touch within the display area. In another embodiment, display portion 12 may include a camera, a microphone, and speakers.

Turning to FIG. 1C, FIG. 1C is a simplified orthographic view of electronic device 10 in an open, flat configuration in accordance with one embodiment of the present disclosure. As illustrated, in FIG. 1C, display portion 12 has been rotated on hinge 16 such that display portion 12 is in the same plane as keyboard portion 14. In this configuration, hinge 16 can totally collapse and have a low, flat or relatively flat profile with a low total z-height.

Figure 1E:
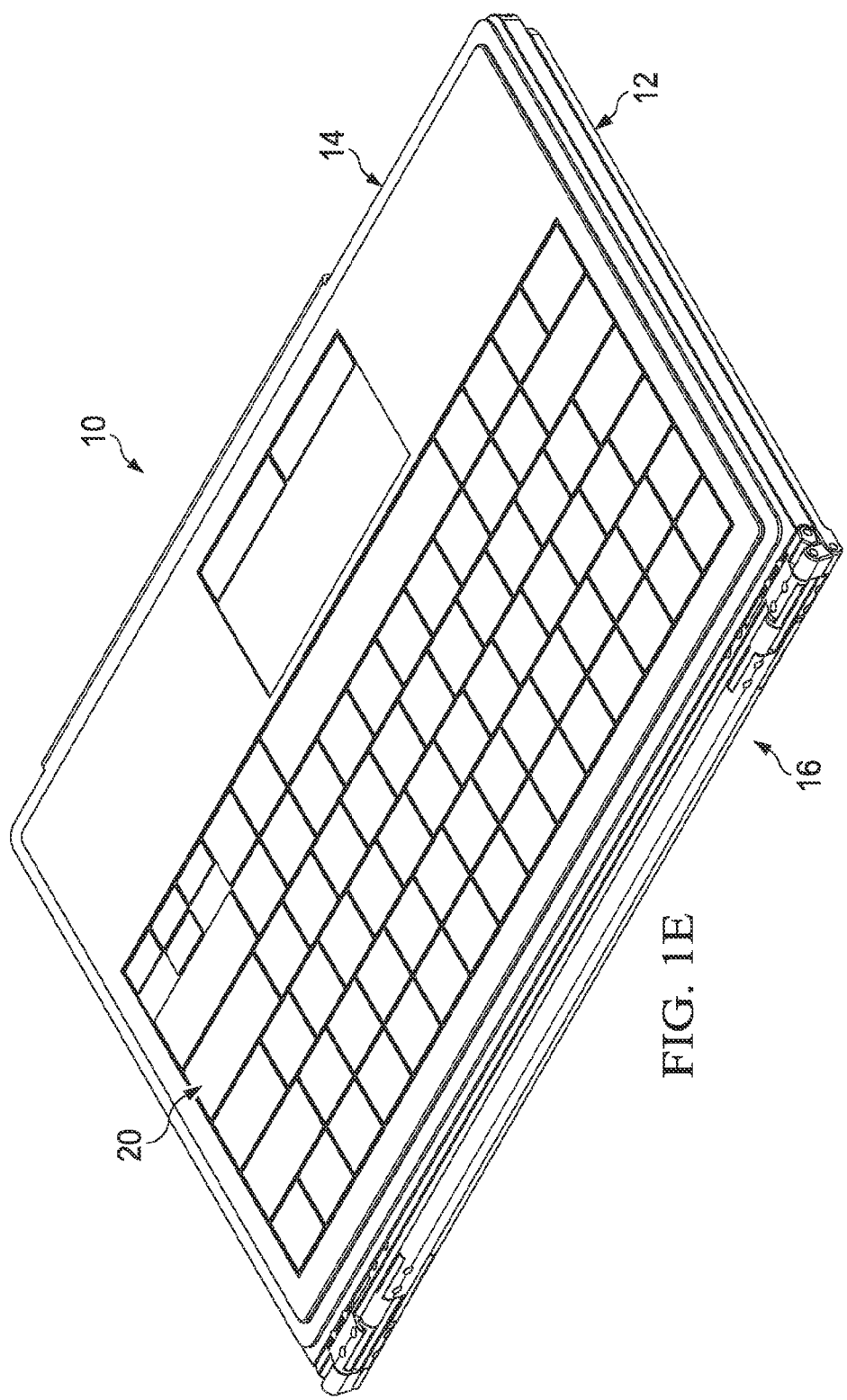
FIG. 1E is a simplified orthographic view illustrating an embodiment of an electronic device in a tablet configuration, in accordance with one embodiment of the present disclosure.

Turning to FIG. 1D, FIG. 1D is a simplified orthographic view of an electronic device in a tablet configuration in accordance with one embodiment of the present disclosure. As illustrated in FIG. 1D, display portion 12 has been rotated around keyboard portion 14 such that display 18 faces away from keyboard 20. Turning to FIG. 1E, FIG. 1E is a simplified orthographic view of an electronic device in a tablet configuration in accordance with one embodiment of the present disclosure. FIG. 1E is illustrating the opposite side of electronic device 10 illustrated in FIG. 1D. Display portion 12 has been rotated around keyboard portion 14 such that display 18 faces away from keyboard 20 and electronic device 10 is configured as a tablet computer or a tablet device.

In general terms, electronic device 10 may be configured to provide a display portion coupled to a keyboard portion using a low-profile hinge. The low-profile hinge can be configured such that the display portion can be rotated 360° around the keyboard portion. The overall system can be configured to operate in a low-profile clamshell mode configuration, a low-profile flat mode configuration, and a low-profile tablet mode configuration with a low z-height.

For purposes of illustrating certain example features of electronic device 10, the following foundational information may be viewed as a basis from which the present disclosure may be properly explained. With the recent touch optimized operating system (OS) release, hybrid laptops (e.g., tablets, convertible laptops, clamshell computers, etc.) have become more popular. However, convertible hinge designs have drawbacks with usability issues for certain consumer groups. For example, current hinge solutions can have bulky hinge components that can create a large profile and inhibit the functionality and usability of an electronic device. For example, bulky hinge components can constrain hybrid electronic devices or 2-in-1 form-factor scaling.

Presently the hybrid electronic devices and convertible form-factor limitations are addressed by enabling low-profile and small form-factor components (e.g., coreless package and motherboard, connectors, batteries, etc.). High density super-capacitors are also being developed to further reduce the battery form-factor and density. In at least one example embodiment discussed herein, an electrical device can be configured with a low-profile hinge design where the overall system can operate in a low-profile clamshell configuration, a low-profile flat configuration, and a low-profile tablet configuration with a low z-height. The low-profile hinge can prevent the hinge form-factor from limiting the scaling of system total z-height by enabling a low-profile, total collapse, 360° hinge using a multiple-friction segment design. The total thickness of the hinge can be scaled according to system z-height through configuring the dimension of segment components. Hence, the overall system z-height can be scaled based on the display portion and keyboard portion and not be limited by the hinge size.

Particular embodiments described herein provide for an electronic device, such as a notebook computer, laptop, cellphone, or other mobile device that includes a circuit board coupled to a plurality of electronic components (which includes any type of components, elements, circuitry, etc.). The electronic device may also include a display portion coupled to a keyboard portion at a hinge. The hinge can be configured to allow a low-profile 360° hinge design for hybrid electronic devices and 2-in-1 applications. The hinge includes 2-friction segments that mechanically attach and interlock to each other. The low-profile 360° hinge is mechanically connected to the display portion (e.g., display panel) and keyboard portion (e.g., system board components) to form the electronic device.

The hinge can include connectors and mechanical retentions to provide an electrical connection between the display portion and the keyboard portion. In one embodiment, the electrical connections between a motherboard in the keyboard portion and display components in the display portion are formed through conventional wire-connections via the segment components. In another embodiment, a printed circuit board (PCB) interconnector is used to electrically connect the display portion and the keyboard portion. In other examples, electrical current and signals can be passed through a plug-in connector (e.g., whose male side protrusion connects to display portion 12 and whose female side connects to keyboard portion 14 or vice-versa) or a wireless connector (e.g., Wi-Fi, Bluetooth, etc.). Note that any number of connectors (e.g., Universal Serial Bus (USB) connectors (e.g., in compliance with the USB 3.0 Specification released in November 2008), Thunderbolt™ connectors, a non-standard connection point such as a docking connector, etc.) can be provisioned in conjunction with electronic device 10. [Thunderbolt™ and the Thunderbolt logo are trademarks of Intel Corporation in the U.S. and/or other countries.]. Virtually any other electrical connection methods could be used and, thus, are clearly within the scope of the present disclosure.

In an embodiment, the majority of the system components (e.g., motherboard, hard drive, battery, communication modules, etc.) remain in the keyboard portion. In certain embodiments the display can be a touchscreen display. The display portion may also contain a camera module, microphone, speakers, and/or a wireless module. Such a design allows for the electronic device to function in a clamshell configuration or a tablet configuration. In an embodiment, the display includes a plurality of electrical components that allow the display portion to function or operate as a tablet.

Figure 2A:
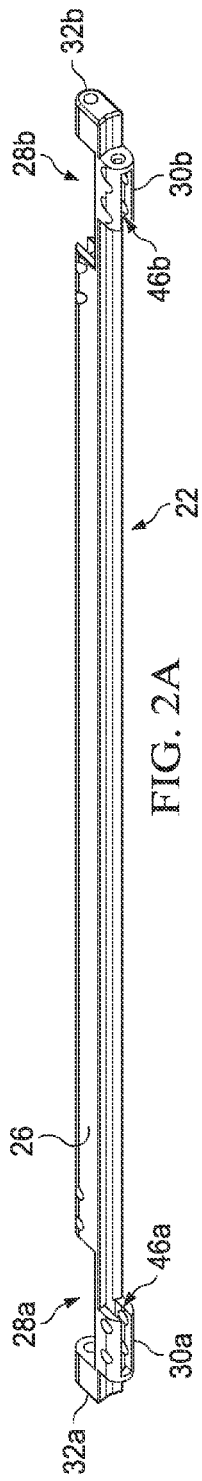
FIG. 2A is a simplified orthographic view illustrating an embodiment of a portion of a hinge, in accordance with one embodiment of the present disclosure.

Turning to FIG. 2A, FIG. 2A is a simplified orthographic view illustrating an embodiment of a portion of hinge 16, in accordance with one embodiment of the present disclosure. As illustrated in FIG. 2A, a first segment 22 of hinge 16 can include a first segment main body 26, a first side first segment cavity 28a, a second side first segment cavity 28b, a first side first segment notch 30a, a second side first segment notch 30b, a first side first segment end 32a, and a second side first segment end 32b. First side first segment notch 30a can include a first side first segment notch channel 46a. Second side first segment notch 30b can include a second side first segment notch channel 46b.

Figure 2B:
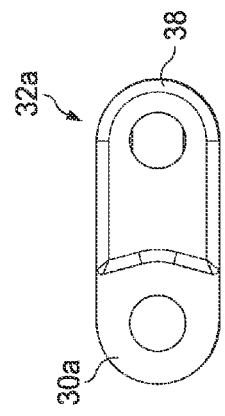
FIG. 2B is a simplified side view illustrating an embodiment of a portion of a hinge, in accordance with one embodiment of the present disclosure.

Turning to FIG. 2B, FIG. 2B is a simplified side view illustrating an embodiment of a portion of hinge 16, in accordance with one embodiment of the present disclosure. First side first segment end 32a can include first profile 38. First profile 38 may include a rounded or concave bottom profile. First side first segment notch 30a is visible in the side view illustration of FIG. 2B. Second side first segment end 32b can also include a similar first profile 38 and be a mirror image of first side first segment end 32a.

Figure 3A:
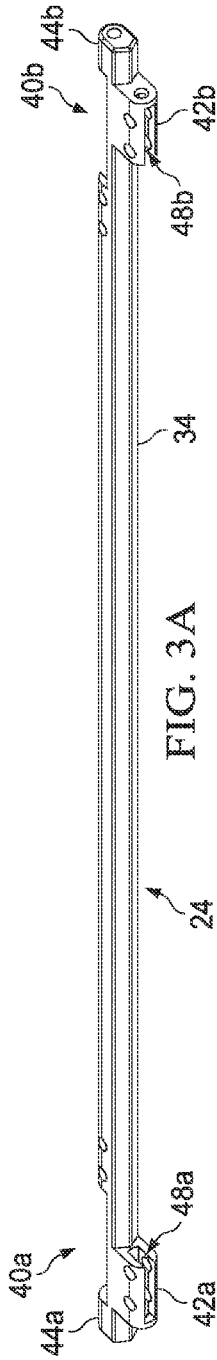
FIG. 3A is a simplified orthographic view illustrating an embodiment of a portion of a hinge, in accordance with one embodiment of the present disclosure.

Turning to FIG. 3A, FIG. 3A is a simplified orthographic view illustrating an embodiment of a portion of hinge 16, in accordance with one embodiment of the present disclosure. As illustrated in FIG. 3A, a second segment 24 of hinge 16 can include a second segment main body 34, a first side second segment cavity 40a, a second side second segment cavity 40b, a first side second segment notch 42a, a second side second segment notch 42b, a first side second segment end 44a, and a second side second segment end 44b. First side second segment notch 42a can include a first side second segment notch channel 48a. Second side second segment notch 42b can include a second side second segment notch channel 48b.

Figure 3B:
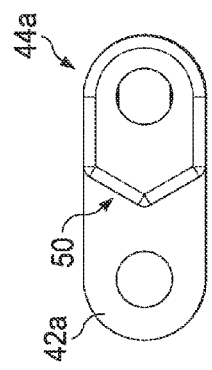
FIG. 3B is a simplified side view illustrating an embodiment of a portion of a hinge, in accordance with one embodiment of the present disclosure.

Turning to FIG. 3B, FIG. 3B is a simplified side view illustrating an embodiment of a portion of hinge 16, in accordance with one embodiment of the present disclosure. First side second segment end 44a can include a second profile 50. Second profile 50 may be a peak profile. First side second segment notch 42a is visible is the side view illustration of FIG. 3B. Second side second segment end 44b can also include a similar second profile 50 and be a mirror image of first side second segment end 42a.

Turning to FIG. 4, FIG. 4 is a simplified orthographic view of a portion of hinge 16 in accordance with one embodiment of the present disclosure. FIG. 4 illustrates a coupler 52 that can be used to couple first segment 22 and second segment 24 together. Coupler 52 can include a main body 60, a first coupling arm 62, and a second coupling arm 64. Main body 60 connects first coupling arm 62 and second coupling arm 64. Second coupling arm 64 can be offset or rotated relatively to first coupling arm 62. For example, second coupling arm 64 may be offset or rotated about five degrees to about forty-five degrees relative to first coupling arm 62. Because second coupling arm 64 is offset or rotated relatively to first coupling arm 62, hinge 16 can rotate and still maintain a low z-height.

Figure 5:
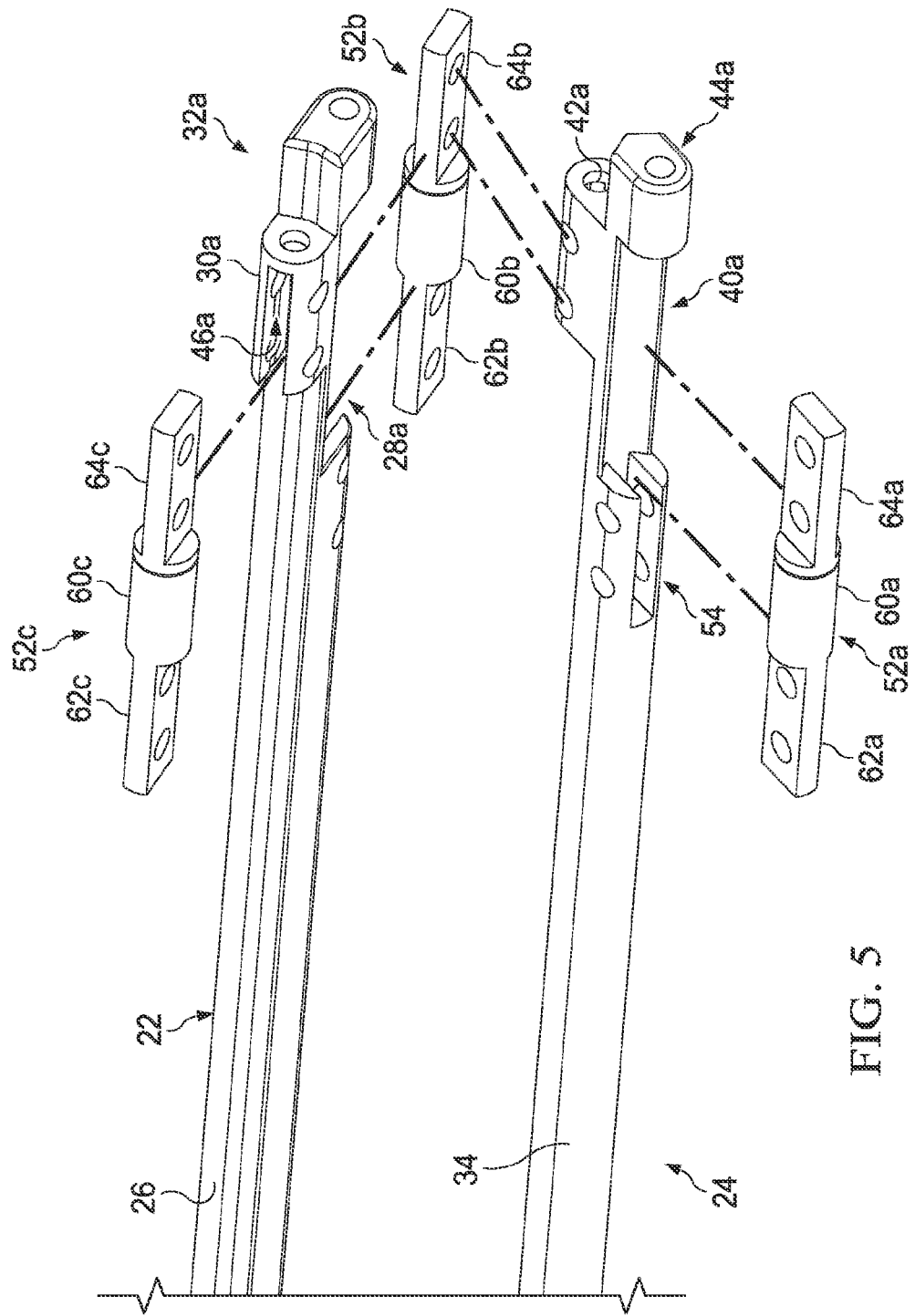
FIG. 5 is a simplified exploded orthographic view illustrating an embodiment of a portion of a hinge, in accordance with one embodiment of the present disclosure.

Turning to FIG. 5, FIG. 5 is a simplified exploded orthographic front view of a portion of hinge 16 in accordance with one embodiment of the present disclosure. As illustrated in FIG. 5, a first coupler 52a can be inserted into first side second segment cavity 40a of second segment 24. First side second segment cavity 40a can include a first side second segment body notch 54 to accommodate first coupler 52a. First coupling arm 62a of first coupler 52a can be inserted into first side second segment body notch 54 of second segment main body 34 and secured or attached to second segment 24. Second coupling arm 64a can be attached to keyboard portion 14 (not shown).

A second coupler 52b can be used to attach second segment 24 to first segment 22. For example, a second coupling arm 64b of second coupler 52b can be inserted into first side second segment notch channel 48a (illustrated in FIG. 3A) of first side second segment notch 42a. A first coupling arm 62b of second coupler 52b can be inserted into first side first segment cavity 28a (see FIG. 6 for a more detailed illustration). This configuration allows first profile 38 to rotate around second profile 50, as illustrated in FIG. 9 discussed below. First side first segment notch 30a can be attached to a second coupling arm 64c of a third coupler 52c. A first coupling arm 62c of third coupler 52c can be attached to display portion 12 (not shown). This configuration allows for a low-profile hinge design that can accommodate about 360° of rotation and has a low z-height.

Figure 6:
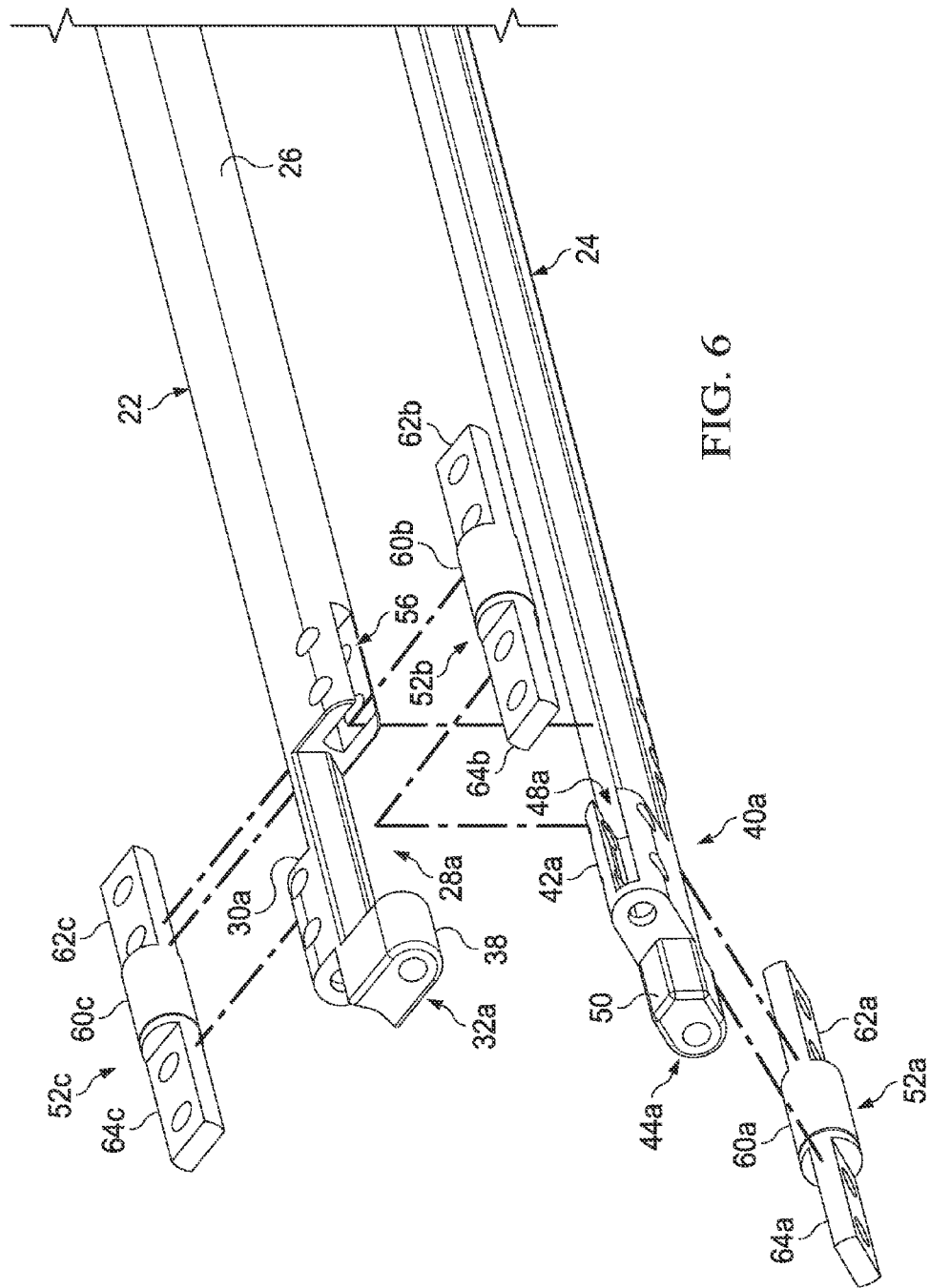
FIG. 6 is a simplified exploded orthographic view illustrating an embodiment of a portion of a hinge, in accordance with one embodiment of the present disclosure.

Turning to FIG. 6, FIG. 6 is a simplified exploded orthographic back view of a portion of hinge 16 in accordance with one embodiment of the present disclosure. As illustrated in FIG. 6, first coupler 52a can be inserted into first side second segment cavity 40a of second segment 24. First coupling arm 62a of first coupler 52a can be inserted into first side second segment body notch 54 (not shown) and secured or attached to second segment 24. Second coupling arm 64a can be attached to keyboard portion 14 (not shown).

Second coupler 52b can attach second segment 24 to first segment 22. For example, second coupling arm 64b of second coupler 52b can be inserted into first side second segment notch channel 48a of first side second segment notch 42a. First coupling arm 62b of second coupler 52b can be inserted into first side first segment body notch 56 of first segment main body 26 and secured to first segment 22. This configuration allows first profile 38 to rotate around second profile 50, as illustrated in FIG. 9 discussed below. First side first segment notch 30a can be attached to second coupling arm 64c of third coupler 52c. First coupling arm 62c of third coupler 52c can be attached to display portion 12 (not shown). This configuration allows for a low-profile hinge design that can accommodate about 360° of rotation and has a low z-height.

Turning to FIG. 7, FIG. 7 is a simplified orthographic view illustrating an embodiment of a portion of electronic device 10 in accordance with one embodiment of the present disclosure. As illustrated in FIG. 7, first segment 22 and second segment 24 of hinge are joined or otherwise connected together to form a low-profile hinge design that can accommodate about 360° of rotation and has a low z-height. Hinge 16 can be connected to a first segment (e.g., keyboard portion 14) and a second segment (e.g., display portion 12) of a device (e.g., electronic device 10).

Turning to FIG. 8, FIG. 8 is a simplified schematic diagram illustrating an embodiment of a portion of hinge 16, in accordance with one embodiment of the present disclosure. As illustrated in FIG. 8, second coupler 52b has been used to attach second segment 24 to first segment 22. Second coupling arm 64b of second coupler 52b has been inserted into first side second segment notch channel 48a of first side second segment notch 42a. First coupling arm 62b of second coupler 52b has been inserted into first side first segment body notch 56 of first segment main body 26. This configuration allows first profile 38 to rotate around second profile 50. First side first segment notch 30a can be attached to second coupling arm 64c (not shown) of third coupler 52c. First coupling arm 62c of third coupler 52c can be attached to display portion 12 (not shown). This configuration allows for a low-profile hinge design that can accommodate about 360° of rotation.

Turning to FIG. 9, FIG. 9 is a simplified side view illustrating an embodiment of a portion of hinge 16, in accordance with one embodiment of the present disclosure. In this particular embodiment, first side first segment end 32a of first segment 22 includes first profile 38. First profile 38 has a general rounded or concave bottom profile. First side second segment end 44a of second segment 24 includes second profile 50. Second profile 50 has a general peak profile. In an illustrative use example, first profile 38 of first segment 22 can rotate across second profile 50 of second segment 24. This configuration allows for a low-profile hinge design that can accommodate about 360° of rotation and the overall system can be configured to operate in a low-profile clamshell mode configuration, a low-profile flat mode configuration, and a low-profile tablet mode configuration with a low z-profile.

Figure 10A:
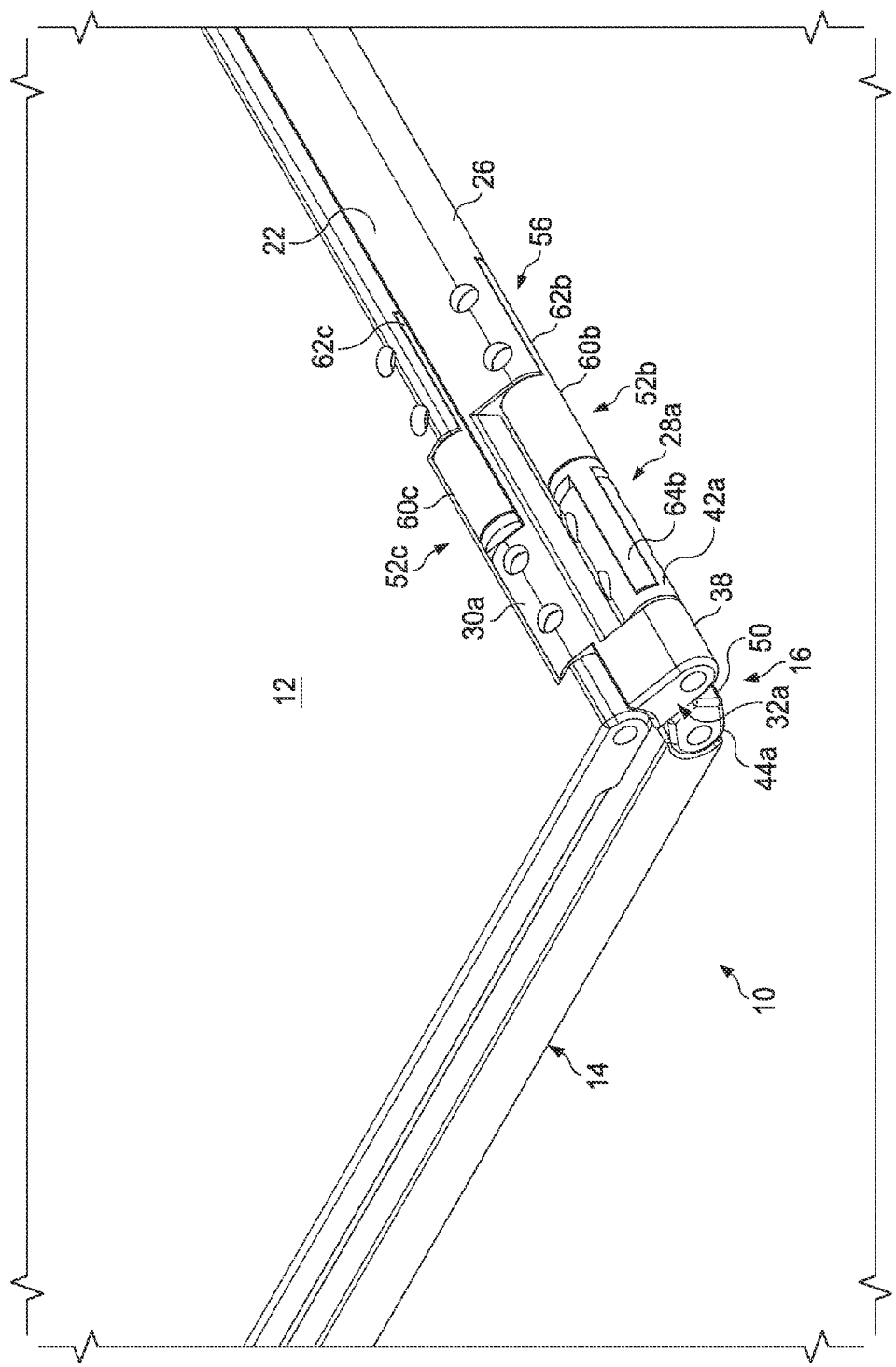
FIG. 10A is a simplified orthographic view illustrating an embodiment of a portion of an electronic device in a closed landscape clamshell configuration, in accordance with one embodiment of the present disclosure.

Turning to FIG. 10A, FIG. 10A is a simplified orthographic view illustrating an embodiment of a portion of an electronic device 10 in a closed clamshell configuration in accordance with one embodiment of the present disclosure. FIG. 10A is a close up, more detailed view of electronic device 10 illustrated in FIG. 1A.

Figure 10B:
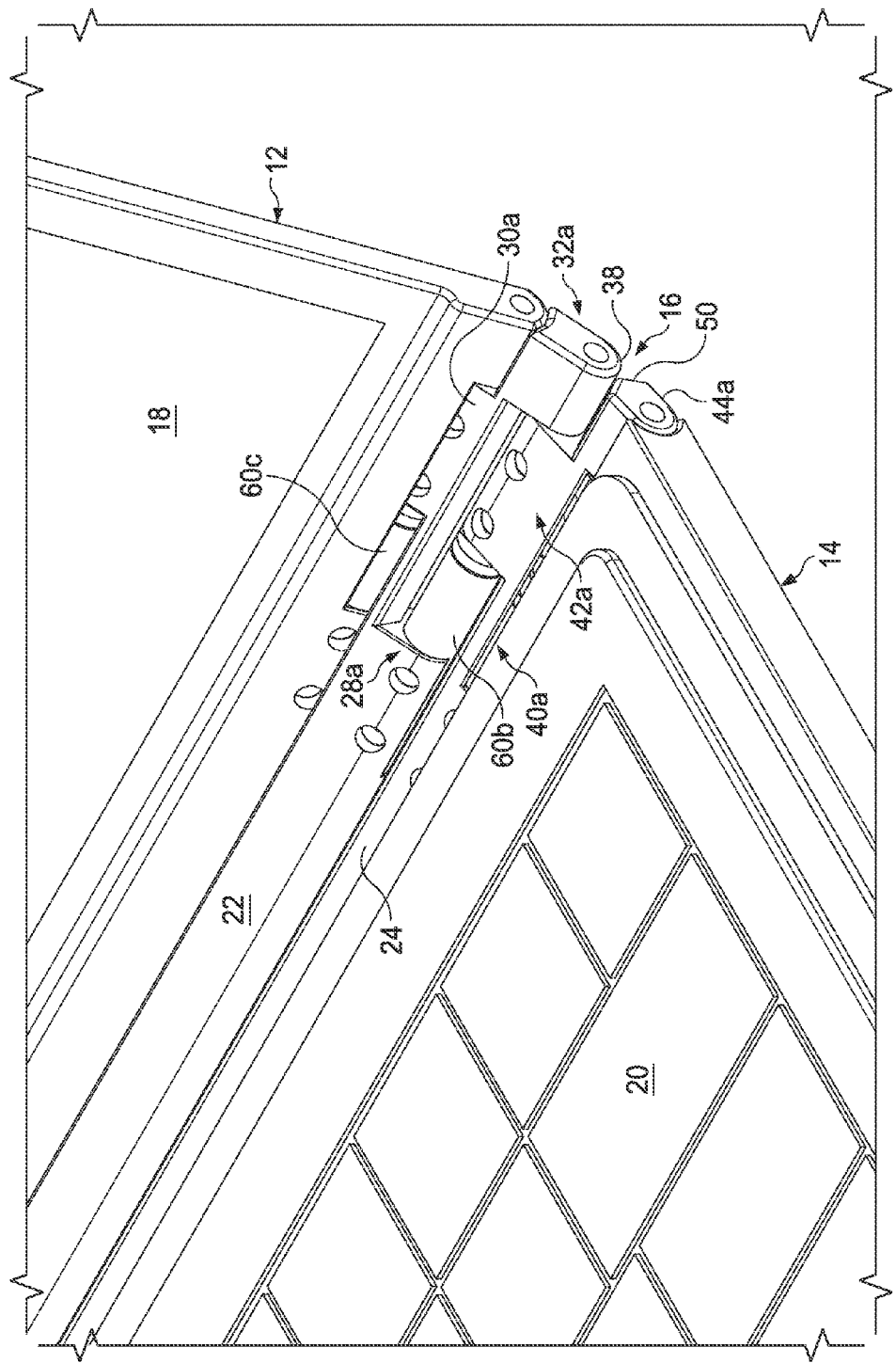
FIG. 10B is a simplified orthographic view illustrating an embodiment of a portion of an electronic device in an open clamshell configuration, in accordance with one embodiment of the present disclosure.

Turning to FIG. 10B, FIG. 10B is a simplified orthographic view of a portion of electronic device 10 in an open clamshell configuration in accordance with one embodiment of the present disclosure. FIG. 10B is a close up, more detailed view of electronic device 10 illustrated in FIG. 1B. As illustrated in FIG. 10B, first profile 38 has rotated around second profile 50. Because second coupling arm 64 is offset or rotated relatively to first coupling arm 62, hinge 16 can rotate around and still maintain a low z-height.

Figure 10C:
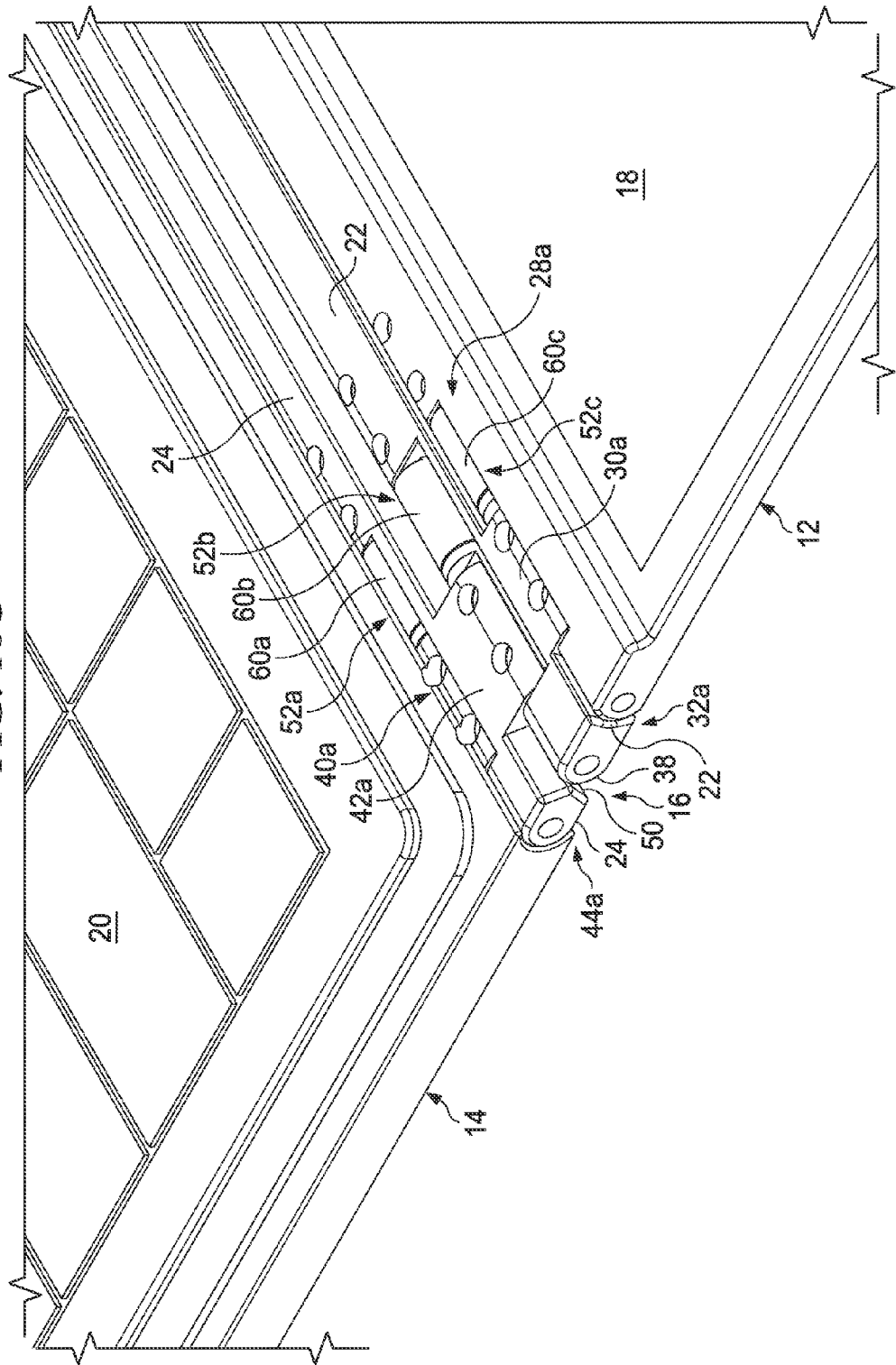
FIG. 10C is a simplified orthographic view illustrating an embodiment of a portion of an electronic device in a flat configuration, in accordance with one embodiment of the present disclosure.

Turning to FIG. 10C, FIG. 10C is a simplified orthographic view of a portion of electronic device 10 in an open flat configuration in accordance with one embodiment of the present disclosure. FIG. 10C is a close up, more detailed view of electronic device 10 illustrated in FIG. 1C. As illustrated in FIG. 10C, first profile 38 has continued to rotate around second profile 50. First coupler 52a, second coupler 52b, and third coupler 52c allow first segment 22 and second segment 24 to have a relatively flat profile and the configuration of hinge 16 allows electronic device 10 to have a flat or relatively flat profile with a low total z-height.

Turning to FIG. 10D, FIG. 10D is a simplified orthographic view of a portion of an electronic device 10 in accordance with one embodiment of the present disclosure. As illustrated in FIG. 10D, first profile 38 has continued to rotate around second profile 50. In addition, because second coupling arm 64 is offset or rotated relatively to first coupling arm 62, hinge 16 can rotate around and still maintain a low z-height such that first coupler 52a, second coupler 52b, and third coupler 52c allow first segment 22 and second segment 24 to conform to a low-profile configuration.

Figure 10E:
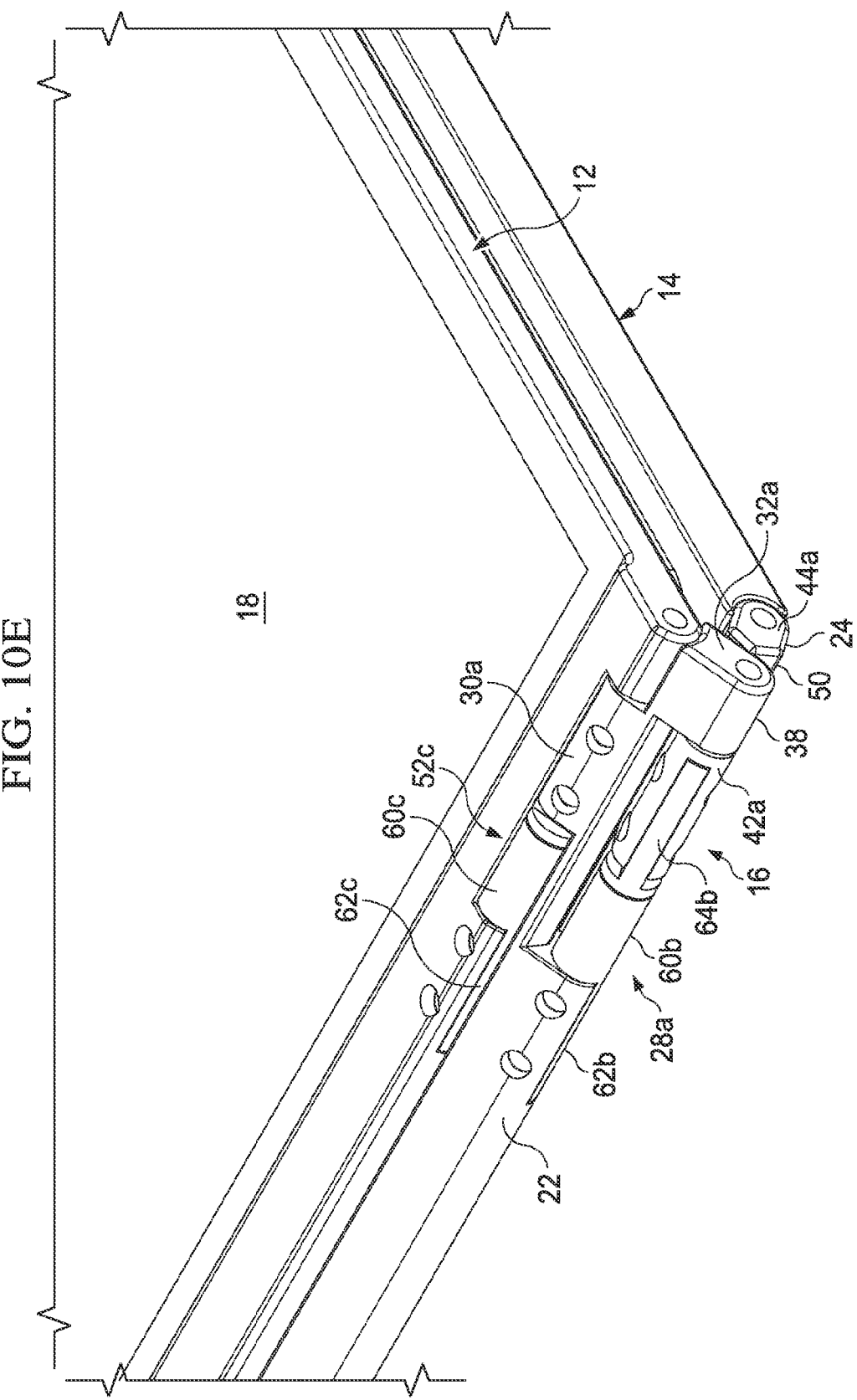
FIG. 10E is a simplified orthographic view illustrating an embodiment of a portion of an electronic device in a tablet configuration, in accordance with one embodiment of the present disclosure.

Turning to FIG. 10E, FIG. 10E is a simplified orthographic view illustrating an embodiment of a portion of electronic device 10, in accordance with one embodiment of the present disclosure. FIG. 10E is a close up, more detailed view of electronic device 10 illustrated in FIG. 1D. As illustrated in FIG. 10E, first profile 38 has continued to rotate around second profile 50 until a tablet configuration is realized. Because second coupling arm 64 is offset or rotated relatively to first coupling arm 62, hinge 16 can rotate around and still maintain a low z-height.

Figure 11:
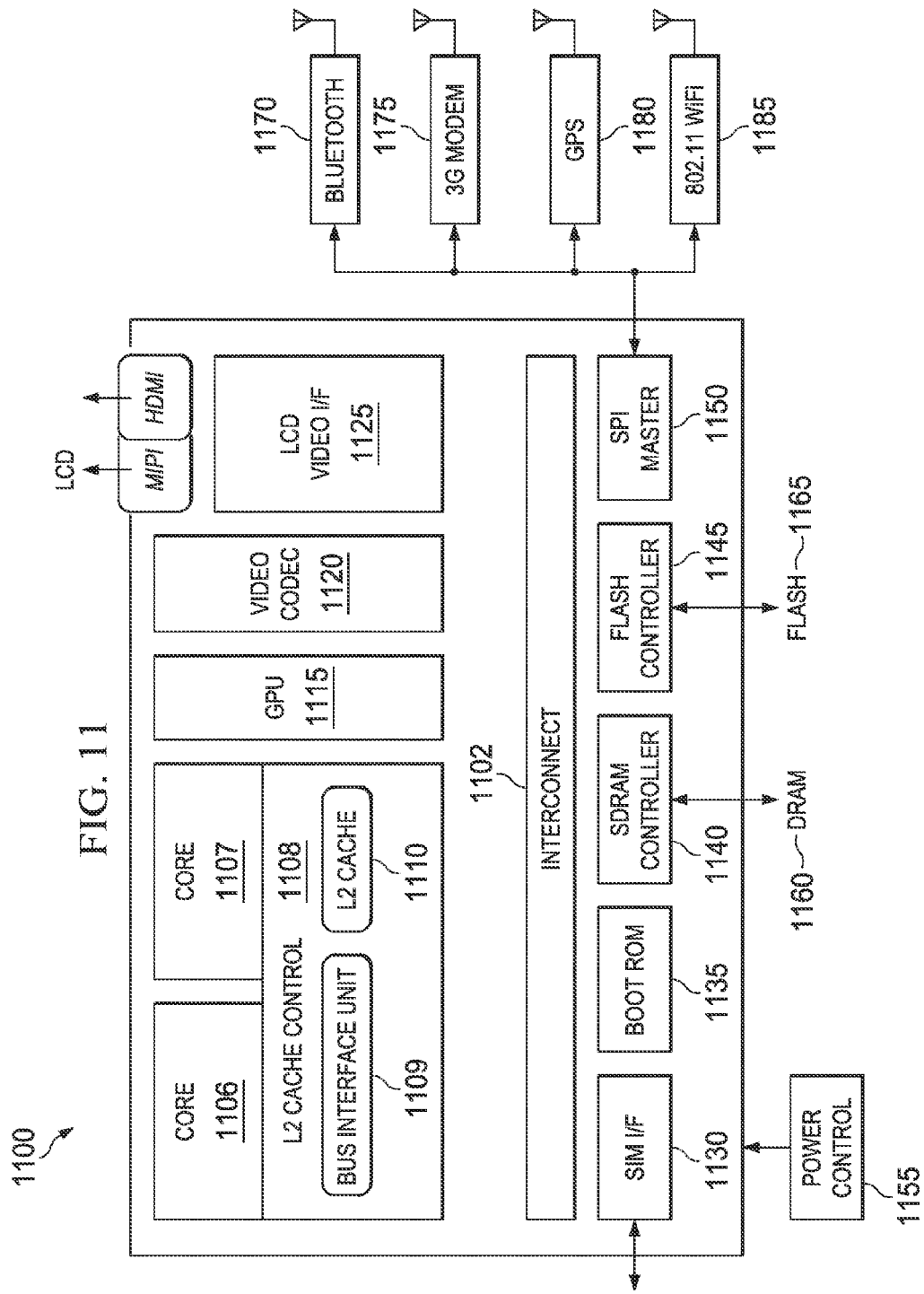
FIG. 11 is a simplified block diagram associated with an example ARM ecosystem system on chip (SOC) of the present disclosure.

Turning to FIG. 11, FIG. 11 is a simplified block diagram associated with an example ARM ecosystem SOC 1100 of the present disclosure. At least one example implementation of the present disclosure can include the low-profile hinge features discussed herein and an ARM component. For example, the example of FIG. 11 can be associated with any ARM core (e.g., A-9, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 11, ARM ecosystem SOC 1100 may include multiple cores 1106-1107, an L2 cache control 1108, a bus interface unit 1109, an L2 cache 1110, a graphics processing unit (GPU) 1115, an interconnect 1102, a video codec 1120, and a liquid crystal display (LCD) I/F 1125, which may be associated with mobile industry processor interface (MIPI)/high-definition multimedia interface (HDMI) links that couple to an LCD.

ARM ecosystem SOC 1100 may also include a subscriber identity module (SIM) I/F 1130, a boot read-only memory (ROM) 1135, a synchronous dynamic random access memory (SDRAM) controller 1140, a flash controller 1145, a serial peripheral interface (SPI) master 1150, a suitable power control 1155, a dynamic RAM (DRAM) 1160, and flash 1165. In addition, one or more example embodiments include one or more communication capabilities, interfaces, and features such as instances of Bluetooth™ 1170, a 3G modem 1175, a global positioning system (GPS) 1180, and an 802.11 WiFi 1185.

In operation, the example of FIG. 11 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 12:
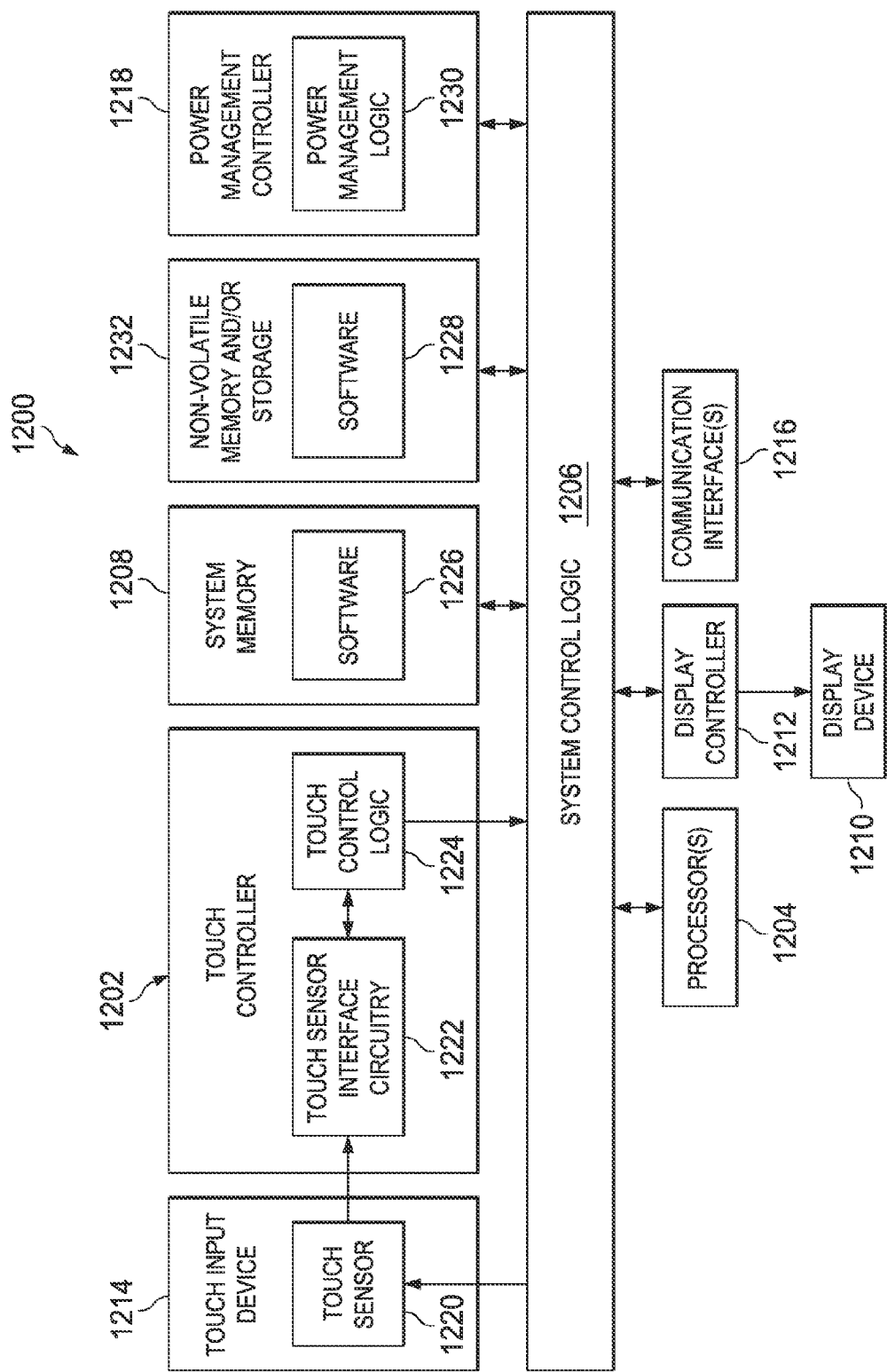
FIG. 12 is a simplified block diagram illustrating example logic that may be used to execute activities associated with the present disclosure.

Turning to FIG. 12, FIG. 12 is a simplified block diagram illustrating potential electronics and logic that may be associated with the electronic devices discussed herein. In at least one example embodiment, system 1200 can include a touch controller 1202, one or more processors 1204, system control logic 1206 coupled to at least one of processor(s) 1204, system memory 1208 coupled to system control logic 1206, non-volatile memory and/or storage device(s) 1232 coupled to system control logic 1206, display controller 1212 coupled to system control logic 1206, display controller 1212 coupled to a display device 1210, power management controller 1218 coupled to system control logic 1206, and/or communication interfaces 1216 coupled to system control logic 1206.

Hence, the basic building blocks of any computer system (e.g., processor, memory, I/O, display, etc.) can be used in conjunction with the teachings of the present disclosure. Certain components could be discrete or integrated into a System on Chip (SoC). Some general system implementations can include certain types of form factors in which system 1200 is part of a more generalized enclosure. In alternate implementations, instead of notebook device/laptops, etc., certain alternate embodiments deal with mobile phones, tablet devices, etc.

System control logic 1206, in at least one embodiment, can include any suitable interface controllers to provide for any suitable interface to at least one processor 1204 and/or to any suitable device or component in communication with system control logic 1206. System control logic 1206, in at least one embodiment, can include one or more memory controllers to provide an interface to system memory 1208. System memory 1208 may be used to load and store data and/or instructions, for example, for system 1200. System memory 1208, in at least one embodiment, can include any suitable volatile memory, such as suitable dynamic random access memory (DRAM) for example. System control logic 1206, in at least one embodiment, can include one or more I/O controllers to provide an interface to display device 1210, touch controller 1202, and non-volatile memory and/or storage device(s) 1232.

Non-volatile memory and/or storage device(s) 1232 may be used to store data and/or instructions, for example within software 1228. Non-volatile memory and/or storage device(s) 1232 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 1218 may include power management logic 1230 configured to control various power management and/or power saving functions. In at least one example embodiment, power management controller 1218 is configured to reduce the power consumption of components or devices of system 1200 that may either be operated at reduced power or turned off when the electronic device is in a closed configuration. For example, in at least one embodiment, when the electronic device is in a closed configuration, power management controller 1218 performs one or more of the following: power down the unused portion of the display and/or any backlight associated therewith; allow one or more of processor(s) 1204 to go to a lower power state if less computing power is required in the closed configuration; and shutdown any devices and/or components that are unused when an electronic device is in the closed configuration.

Communications interface(s) 1216 may provide an interface for system 1200 to communicate over one or more networks and/or with any other suitable device. Communications interface(s) 1216 may include any suitable hardware and/or firmware. Communications interface(s) 1216, in at least one example embodiment, may include, for example, a network adapter, a wireless network adapter, a telephone modem, and/or a wireless modem. System control logic 1206, in at least one embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one embodiment, at least one processor 1204 may be packaged together with logic for one or more controllers of system control logic 1206. In at least one embodiment, at least one processor 1204 may be packaged together with logic for one or more controllers of system control logic 1206 to form a System in Package (SiP). In at least one embodiment, at least one processor 1204 may be integrated on the same die with logic for one or more controllers of system control logic 1206. For at least one embodiment, at least one processor 1204 may be integrated on the same die with logic for one or more controllers of system control logic 1206 to form a System on Chip (SoC).

For touch control, touch controller 1202 may include touch sensor interface circuitry 1222 and touch control logic 1224. Touch sensor interface circuitry 1222 may be coupled to detect, using a touch sensor 1220, touch input over a first touch surface layer and a second touch surface layer of a display (i.e., display device 1210). Touch sensor interface circuitry 1222 may include any suitable circuitry that may depend, for example, at least in part on the touch-sensitive technology used for a touch input device 1214. Touch sensor interface circuitry 1222, in one embodiment, may support any suitable multi-touch technology. Touch sensor interface circuitry 1222, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 1224 may be coupled to help control touch sensor interface circuitry 1222 in any suitable manner to detect touch input over a first touch surface layer and a second touch surface layer. Touch control logic 1224 for at least one example embodiment may also be coupled to output in any suitable manner digital touch input data corresponding to touch input detected by touch sensor interface circuitry 1222. Touch control logic 1224 may be implemented using any suitable logic, including any suitable hardware, firmware, and/or software logic (e.g., non-transitory tangible media), that may depend, for example, at least in part on the circuitry used for touch sensor interface circuitry 1222. Touch control logic 1224 for at least one embodiment may support any suitable multi-touch technology.

Touch control logic 1224 may be coupled to output digital touch input data to system control logic 1206 and/or at least one processor 1204 for processing. At least one processor 1204 for at least one embodiment may execute any suitable software to process digital touch input data output from touch control logic 1224. Suitable software may include, for example, any suitable driver software and/or any suitable application software. As illustrated in FIG. 12, system memory 1208 may store suitable software 1226 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

One particular example implementation of an electronic device may include activities associated with a low-profile hinge design. The low-profile hinge design allows for a hybrid or convertible laptop hinge that does not have bulky hinge components that can create a large profile, inhibit the functionality and usability of an electronic device, and have significant industrial design implications. The low-profile hinge can be configured with a first segment that connects to a first element using a first coupler and a second segment that connects to the first segment using a second coupler, where the second segment connects to a second element using a third coupler. The first coupler, the second coupler, and the third coupler can each have a first coupling arm and a second coupling arm. The first coupling arm is offset from a plane of the second coupling arm by about five degrees to about forty-five degrees. The low-profile hinge can lay flat on a planer surface and can rotate about three hundred and sixty degrees. In an example, a side of the first segment includes a peak profile and a side bottom edge of the second segment can rotate around the peak profile. In addition, the first element may be a keyboard portion of an electronic device and the second segment may be a display portion of the electronic device.

Other Notes and Examples

Example A1 is an electronic device that includes a first segment that connects to a first element using a first coupler and a second segment that connects to the first segment using a second coupler, where the second segment connects to a second element using a third coupler.

In Example A2, the subject matter of Example A1 may optionally include where the first coupler, the second coupler and the third coupler each have a first coupling arm and a second coupling arm.

In Example A3, the subject matter of any of the preceding 'A' Examples can optionally include where the first coupling arm is offset from a plane of the second coupling arm by about five degrees to about forty-five degrees.

In Example A4, the subject matter of any of the preceding 'A' Examples can optionally include where the hinge can lay relatively flat on a planer surface.

In Example A5, the subject matter of any of the preceding 'A' Examples can optionally include where the hinge can rotate about three hundred and sixty degrees.

In Example A6, the subject matter of any of the preceding 'A' Examples can optionally include where a side of the first segment includes a peak profile and a side bottom edge of the second segment can rotate around the peak profile.

In Example A7, the subject matter of any of the preceding 'A' Examples can optionally include where the first element is an input device of an electronic device and the second element is a display portion of the electronic device.

In Example A8, the subject matter of any of the preceding 'A' Examples can optionally include where the input device includes a first touch screen and the display portion includes a second touch screen.

Example AA1 can include an electronic device that includes an input device coupled to a first segment using a first coupler, a second segment that is coupled to the first segment using a second coupler, and a display portion coupled to the second segment using a third coupler.

In Example AA2, the subject matter of any of the preceding 'AA' Examples can optionally include where the first coupler, the second coupler and the third coupler each have a first coupling arm and a second coupling arm.

In Example AA3, the subject matter of any of the preceding 'AA' Examples can optionally include where the first coupling arm is offset from a plane of the second coupling arm by about five degrees to about forty-five degrees.

In Example AA4, the subject matter of any of the preceding 'AA' Examples can optionally include where the first segment and the second segment comprise a hinge and where the hinge can lay relatively flat on a planer surface.

In Example AA5, the subject matter of any of the preceding 'AA' Examples can optionally include where the hinge can rotate about three hundred and sixty degrees.

In Example AA6, the subject matter of any of the preceding 'AA' Examples can optionally include where a side of the first portion includes a peak profile and a side bottom edge of the second segment can rotate around the peak profile.

In Example AA7, the subject matter of any of the preceding 'AA' Examples can optionally include where the hinge is a low-profile hinge.

Example M1 is a method that includes rotating a display portion around an input device using a low-profile hinge, where the hinge includes a first segment coupled the input device using a first coupler, and a second segment coupled to the first segment using a second coupler, where the second segment is coupled to the display portion using a third coupler.

In Example M2, the subject matter of any of the preceding 'M' Examples can optionally include where the first coupler, the second coupler, and the third coupler each have a first coupling arm and a second coupling arm.

In Example M3, the subject matter of any of the preceding 'M' Examples can optionally include where the first coupling arm is offset from a plane of the second coupling arm by about five degrees to about forty-five degrees.

In Example M4, the subject matter of any of the preceding 'M' Examples can optionally include where the hinge can lay relatively flat on a planer surface and can rotate about three hundred and sixty degrees.

An example system S1 can include means for rotating a display portion around an input device using a low-profile hinge, where the hinge includes a first segment coupled the input device using a first coupler and a second segment coupled to the first segment using a second coupler, where the second segment is coupled to the display portion using a third coupler.

An example system SS1 can include a processor and a low-profile hinge, where the low-profile hinge includes a first segment that connects to a first element of the system using a first coupler and a second segment that connects to the first segment using a second coupler, where the second segment connects to a second element of the system using a third coupler.

In Example SS2, the subject matter of any of the preceding 'SS' Examples can optionally include where the first coupler, the second coupler and the third coupler each have a first coupling arm and a second coupling arm and the first coupling arm is offset from a plane of the second coupling arm by about five degrees to about forty-five degrees.

In Example SS3, the subject matter of any of the preceding 'SS' Examples can optionally include where the hinge can lay relatively flat on a planer surface and can rotate about three hundred and sixty degrees around the first element.

In Example SS4, the subject matter of any of the preceding 'SS' Examples can optionally include where a side of the first segment includes a peak profile and a side bottom edge of the second segment can rotate around the peak profile.

In Example SS5, the subject matter of any of the preceding 'SS' Examples can optionally include where the first element is an input device of an electronic device and the second element is a display portion of the electronic device.

Example X1 is a machine-readable storage medium including machine-readable instructions to implement a method or realize an apparatus as in any one of the Examples A1-A8, AA1-AA6, M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A low-profile hinge, comprising:
   a first segment that connects to a first element using a first coupler, wherein the first segment extends about the length of the first element and the first coupler is coupled to a first side first segment notch that extends from the first segment; and
   a second segment that connects to the first segment using a second coupler, wherein the second coupler is coupled to a first side second segment notch that extends from the second segment, wherein the second segment connects to a second element using a third coupler, wherein the second segment extends about the length of the second element.

2. The low-profile hinge of claim 1, wherein the first coupler, the second coupler and the third coupler each have a first coupling arm and a second coupling arm.

3. The low-profile hinge of claim 2, wherein the first coupling arm is offset from a plane of the second coupling arm by about five degrees to about forty-five degrees.

4. The low-profile hinge of claim 1, wherein the hinge can lay relatively flat on a planer surface.

5. The low-profile hinge of claim 1, wherein a side of the first segment includes a peak profile and a side bottom edge of the second segment can rotate around the peak profile.

6. The low-profile hinge of claim 1, wherein the first element is an input device of an electronic device and the second element is a display portion of the electronic device.

7. The low-profile hinge of claim 6, wherein the input device includes a first touch screen and the display portion includes a second touch screen.

8. The low-profile hinge of claim 1, wherein the first coupler is positioned at least partially within a first side first segment notch channel in the first side first segment notch and the second coupler is coupled to a a first side second segment notch channel in the first side second segment notch.

9. An electronic device comprising:
   an input portion coupled to a first segment using a first coupler, wherein the first segment extends about the length of the input portion and the first coupler is coupled to a first side first segment notch that extends from the first segment;
   a second segment that is coupled to the first segment using a second coupler, wherein the second coupler is coupled to a first side second segment notch that extends from the second segment; and
   a display portion coupled to the second segment using a third coupler, wherein the second segment extends about the length of the display portion.

10. The electronic device of claim 9, wherein the first coupler, the second coupler and the third coupler each have a first coupling arm and a second coupling arm.

11. The electronic device of claim 10, wherein the first coupling arm is offset from a plane of the second coupling arm by about five degrees to about forty-five degrees.

12. The electronic device of claim 9, wherein the first segment and the second segment comprise a hinge and wherein the hinge can lay relatively flat on a planer surface.

13. The electronic device of claim 12, wherein the hinge can rotate about three hundred and sixty degrees.

14. The electronic device of claim 13, wherein a side of the first portion includes a peak profile and a side bottom edge of the second segment can rotate around the peak profile.

15. The electronic device of claim 12, wherein the hinge is a low-profile hinge.

16. A method, comprising:
   rotating a display portion around an input device using a low-profile hinge, wherein the hinge includes:
   a first segment coupled the input device using a first coupler, wherein the first segment extends about the length of the input portion and the first coupler is coupled to a first side first segment notch that extends from the first segment; and
   a second segment coupled to the first segment using a second coupler, wherein the second coupler is coupled to a first side second segment notch that extends from the second segment, wherein the second segment is coupled to the display portion using a third coupler, wherein the second segment extends about the length of the display portion.

17. The method of claim 16, wherein the first coupler, the second coupler, and the third coupler each have a first coupling arm and a second coupling arm.

18. The method of claim 17, wherein the first coupling arm is offset from a plane of the second coupling arm by about five degrees to about forty-five degrees.

19. The method of claim 16, wherein the hinge can lay relatively flat on a planer surface and can rotate about three hundred and sixty degrees.

20. A system, comprising:
   means for rotating a display portion around an input device using a low-profile hinge, wherein the hinge includes:
   a first segment coupled the input device using a first coupler, wherein the first segment extends about the length of the input device and the first coupler is coupled to a first side first segment notch that extends from the first segment; and
   a second segment coupled to the first segment using a second coupler, wherein the second coupler is coupled to a first side second segment notch that extends from the second segment, wherein the second segment is coupled to the display portion using a third coupler, wherein the second segment extends about the length of the second element.

21. A system, comprising:
   a processor;
   a low-profile hinge, wherein the low-profile hinge includes a first segment that connects to a first element of the system using a first coupler and a second segment that connects to the first segment using a second coupler, wherein the second segment connects to a second element of the system using a third coupler.

22. The system of claim 21, wherein the first coupler, the second coupler, and the third coupler each have a first coupling arm and a second coupling arm and the first coupling arm is offset from a plane of the second coupling arm by about five degrees to about forty-five degrees.

23. The system of claim 21, wherein the hinge can lay relatively flat on a planer surface and can rotate about three hundred and sixty degrees around the first element.

24. The system of claim 21, wherein a side of the first segment includes a peak profile and a side bottom edge of the second segment can rotate around the peak profile.

25. The system of claim 21, wherein the first element is an input device of an electronic device and the second element is a display portion of the electronic device.

* * * * *